(No Model.) 2 Sheets—Sheet 1.

L. F. HAUBTMAN.
DEFECATOR FOR CANE JUICE.

No. 366,830. Patented July 19, 1887.

WITNESSES:
Chas Hide
C. Sedgwick.

INVENTOR:
L. F. Haubtman
BY Munn & Co
ATTORNEYS.

(No Model.) 2 Sheets—Sheet 2.
L. F. HAUBTMAN.
DEFECATOR FOR CANE JUICE.
No. 366,830. Patented July 19, 1887.
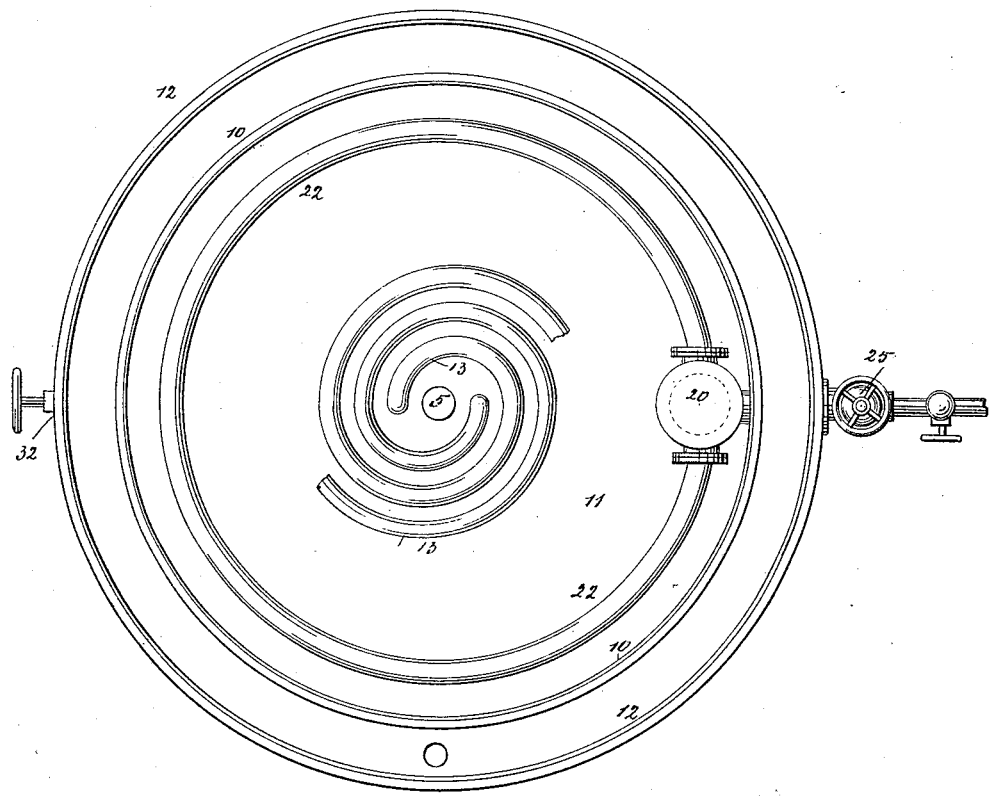
Fig: 3
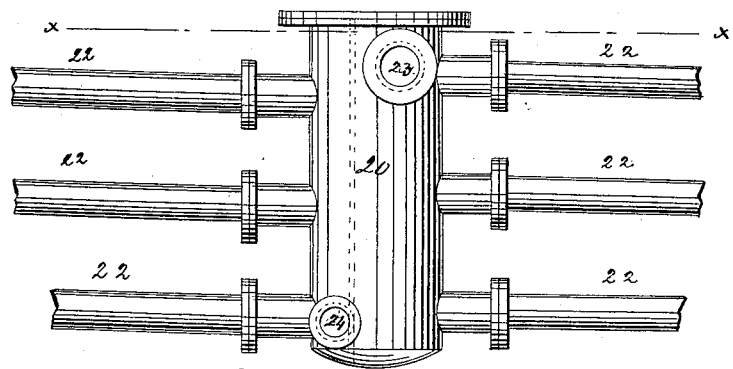
Fig: 4.
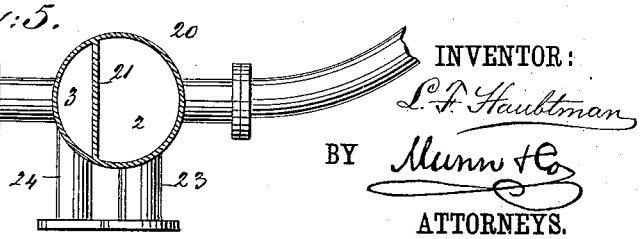
Fig: 5.
WITNESSES:
Chas. Nigg.
C. Sedgwick
INVENTOR:
L. F. Haubtman
BY Munn & Co
ATTORNEYS.

UNITED STATES PATENT OFFICE.

LEON F. HAUBTMAN, OF NEW ORLEANS, LOUISIANA.

DEFECATOR FOR CANE-JUICE.

SPECIFICATION forming part of Letters Patent No. 366,830, dated July 19, 1887.

Application filed September 1, 1886. Serial No. 212,410. (No model.)

*To all whom it may concern:*

Be it known that I, LEON F. HAUBTMAN, of New Orleans, in the parish of Orleans and State of Louisiana, have invented a new and Improved Defecator for Cane-Juice, of which the following is a full, clear, and exact description.

The object of my present invention is to provide a new and improved form of defecator, wherein the vessel and its connections shall be so arranged that the scum will be automatically delivered from the main portion of the vessel; and to this end the invention consists of a vessel provided with a double steam-coil that is arranged to receive steam from the center, and to discharge said steam and the water of condensation from the outer ends of the coil, the upper face of said coil being somewhat convex; and the invention further consists of a novel arrangement for utilizing the waste steam from the mill-engines, all of which will be hereinafter more fully explained, and specifically pointed out in the claims.

Reference is to be had to the accompanying drawings, forming a part of this specification, in which similar figures of reference indicate corresponding parts in all the views.

Figure 1:
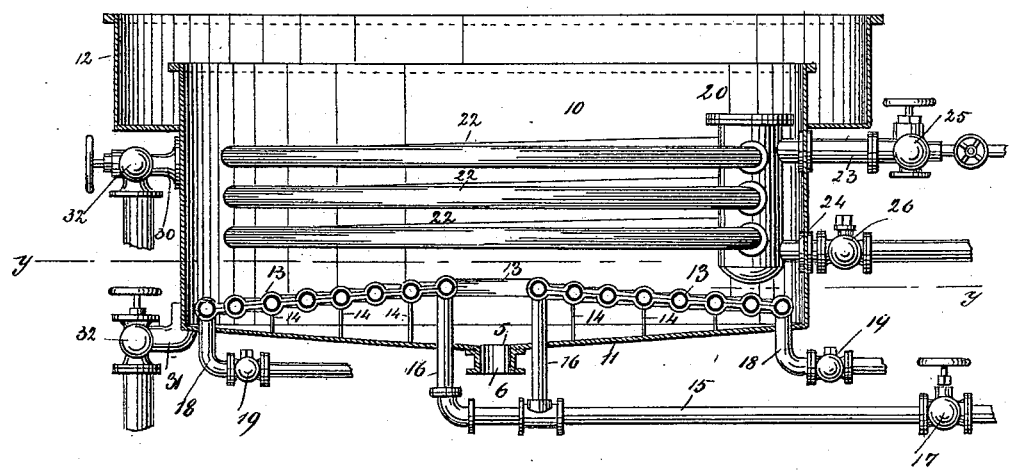
Figure 2:
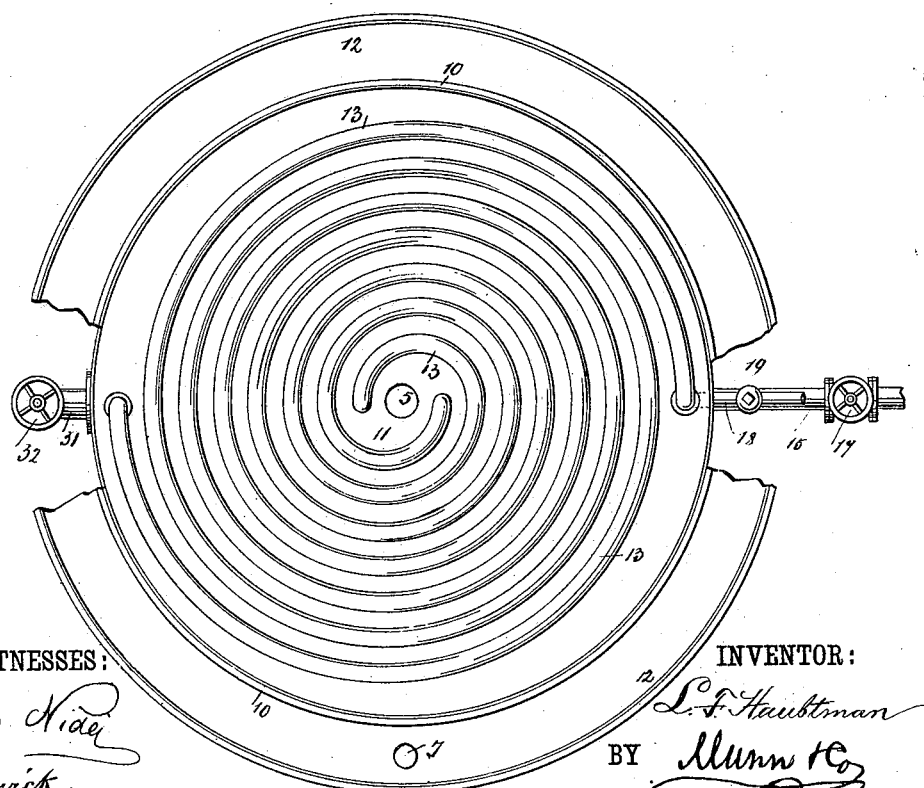

Figure 1 is a central sectional elevation of my improved form of defecator, the waste-steam coil, however, being shown in full lines. Fig. 2 is a plan view of the defecator with the waste-steam coil removed, a portion of the scum-trough being broken away, and the parts shown beneath being taken upon the line *y y* of Fig. 1. Fig. 3 is a plan view of the defecator, a portion of the main steam-coils, however, being broken away. Fig. 4 is an enlarged side view of the divided cylinder, which serves as the supply and exhaust cylinder of the waste-steam coil; and Fig. 5 is a sectional view taken on line *x x* of Fig. 4.

In the drawings, 10 represents a cylindrical vessel that is provided with a concave bottom, 11, and surrounded by a wall, 12, the outer wall of which extends upward above the main wall of the vessel 10. Within the vessel 10 there is arranged a double spiral coil, 13, which said coil is supported by standards 14, that rest upon the bottom 11; but any other convenient supporting device might be employed. The coils 13 fall gradually as they recede from the center toward the side wall of the vessel 10, and consequently the upper surface of the coils, as a whole, is in the form of the frustum of a low or expanded cone, or the form might be slightly convex.

The inner end of each section of the coil 13 is connected with a steam-supply pipe, 15, by means of a pipe or tube, as 16, and the steam-supply pipe 15 is in turn connected with the boiler or other source of steam-supply, a valve, 17, being, however, interposed between the coils 13 and the source from whence the steam is drawn. Two sections of the coil 13 exhaust through tubes 18, which are provided with valves 19, as shown best in Fig. 1.

Above the coil 13 there is mounted a cylinder, 20, which is divided by a partition, 21, into chambers 2 and 3, and with this cylinder there is connected a steam-supply pipe, 23, and an exhaust pipe, 24, the steam-supply pipe being provided with a valve, 25, and the exhaust-pipe with a valve, 26. A number of tubes, 22, are connected with the cylinder 20, so as to be in communication with its chamber 2, and the opposite ends of these pipes 22 are connected with the cylinder, so as to be in communication with the chamber 3; but the connection between that end of each pipe which is in communication with the chamber 3 is lower than the connection of the opposite end of the pipe which is in communication with the chamber 2.

The pipe 23 is arranged to receive the waste steam from the mill-engines, and it will be noticed that this pipe is in communication with the chamber 2, so that all water of condensation formed in the pipes 22 will flow into the chamber 3, and from there be withdrawn through the pipe 24.

The vessel 10 is provided with discharge-pipes 30 and 31, that are closed by valves 32 and 33, respectively, and in the bottom of the vessel there is formed an opening, 5, surrounded by a curb, 6, said curb being arranged for connection with any proper form of valve-closed discharge-pipe, and as the bottom 11 is concave, all of the heavier impurities carried by the juice will settle toward the opening 5, to be drawn off through said opening. There is also a valve-closed discharge-opening, 7, formed in the trough 12.

In operation the vessel 10 is filled with cane-juice or other liquid, and steam is supplied to the coils 13 through the pipe 15, the valves 19 at this time being adjusted to regulate the outlet of the steam. As the steam is delivered to the center or inner ends of the coils 13, the preponderance of heat will be at that point—that is, in the center of the vessel—and when the liquid boils (after which the heat is regulated by the valve 17) the impurities are forced from the center toward the edge of the vessel 10, the scum passing over the edge of said vessel and into the trough 12, the action being such that the skimming is automatically performed by means of the novel application of the heat; and it will further be seen that from the peculiar arrangement of the coils 13 the water of condensation will continually flow toward the discharge-pipes 18, and hence it will be impossible for water to accumulate within the coils.

The pipes 22 are used to heat the raw cane-juice as it comes from the mill, and from the peculiar arrangement of the cylinder 20 all danger of back-pressure against the engine is avoided.

Having thus fully described my invention, what I claim as new, and desire to secure by Letters Patent, is—

1. In a defecator, the combination, with a vessel, of the double-spiral coil 13, arranged within the vessel and having the inner ends connected with a steam-supply pipe and the outer ends connected with exhaust-pipes, substantially as herein shown and described.

2. In a defecator, the combination, with a vessel, 10, of spiral coils 13, that incline from the center toward the walls of the vessel, a steam-supply pipe connected to the inner ends of the coils, and exhaust-pipes connected to the outer ends of the coils, substantially as described.

3. In a defecator, the combination, with a vessel, 10, surrounded by a trough, 12, of spiral coils 13, arranged in the form of the frustum of a cone, a steam-supply pipe, 15, connected to the inner ends of the coils, and exhaust-pipes 18, connected to the outer ends of the coils, substantially as described.

4. In a defecator, the combination, with a vessel, 10, formed with a concave bottom, 11, and surrounded by a trough, 12, of spiral coils 13, arranged in the form of the frustum of a cone, a steam-supply pipe, 15, provided with a valve, 17, which pipe is connected with the inner ends of the coils, and discharge-pipes 18, provided with valves 19, said pipes 18 being connected with the outer ends of the coils, substantially as described.

5. In a defecator, the combination, with a vessel, 10, of a cylinder, 20, that is divided by a partition or wall, 21, pipes 22, connected with the cylinder 20, and supply and exhaust pipes connected with the cylinder 20 upon opposite sides of the partition 21, substantially as described.

6. In a defecator, the combination, with a vessel, 10, of a cylinder, 20, having chambers 2 and 3, pipes 22, connecting with the cylinder and communicating with the chambers 2 and 3, the connection of each pipe with the chamber 2 being above that with the chamber 3, a steam-supply pipe communicating with the chamber 2, and an exhaust-pipe communicating with the chamber 3, substantially as described.

LEON F. HAUBTMAN.

Witnesses:
R. B. HOLLY,
JOHN MALLIN.